(12) United States Patent
Nakada et al.

(10) Patent No.: US 8,996,278 B2
(45) Date of Patent: Mar. 31, 2015

(54) CONTROL DEVICE FOR INTERNAL COMBUSTION ENGINE

(75) Inventors: Hayato Nakada, Minamitsuru-gun (JP); Akira Ohata, Mishima (JP); Keisuke Osakabe, Isehara (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/233,635

(22) PCT Filed: Jul. 18, 2012

(86) PCT No.: PCT/IB2012/001550
§ 371 (c)(1),
(2), (4) Date: Jan. 17, 2014

(87) PCT Pub. No.: WO2013/011376
PCT Pub. Date: Jan. 24, 2013

(65) Prior Publication Data
US 2014/0149020 A1 May 29, 2014

(30) Foreign Application Priority Data
Jul. 20, 2011 (JP) .................................. 2011-158722

(51) Int. Cl.
*F02D 41/02* (2006.01)
*G06F 9/38* (2006.01)
(Continued)

(52) U.S. Cl.
CPC ............ *F02D 28/00* (2013.01); *F02D 41/0097* (2013.01); *F02D 41/266* (2013.01); *G05B 19/0421* (2013.01); *F02D 2200/101* (2013.01); *G05B 2219/2205* (2013.01)
USPC ............. 701/102; 701/110; 701/115; 712/32; 712/203; 712/246

(58) Field of Classification Search
USPC .............. 701/102–115; 712/32–35, 203, 245, 712/246
See application file for complete search history.

(56) References Cited

U.S. PATENT DOCUMENTS 5,452,461 A 9/1995 Umekita et al.
7,101,312 B2 * 9/2006 Bauerle et al. ................ 477/111
(Continued)

FOREIGN PATENT DOCUMENTS

DE 40 04 516 A1 8/1991
JP 3-80337 4/1991
(Continued)

OTHER PUBLICATIONS

International Search Report issued Dec. 11, 2012, in PCT/IB2012/001550, filed Jul. 18, 2012.

*Primary Examiner* — Erick Solis
(74) *Attorney, Agent, or Firm* — Oblon, McClelland, Maier & Neustadt, L.L.P.

(57) ABSTRACT

In a control device for an internal combustion engine, which includes control unit that has a processor with a plurality of cores and that computes various tasks associated with operation of the internal combustion engine, the control unit includes a selecting unit, that selects at least one core used in the computation from among the plurality of cores, a computing unit that distributes the tasks to the at least one core selected by the selecting unit to perform computation, and an acquisition unit that acquires an engine, rotational speed of the internal combustion engine, and, when the engine rotational speed acquired by the acquisition unit is higher than or equal to a predetermined threshold, the selecting unit increases the number of the cores selected as compared with when the acquired engine rotational speed is lower than the predetermined threshold.

6 Claims, 3 Drawing Sheets

(51) Int. Cl.
*F02D 28/00* (2006.01)
*F02D 41/00* (2006.01)
*F02D 41/26* (2006.01)
*G05B 19/042* (2006.01)

(56) References Cited

U.S. PATENT DOCUMENTS

2007/0038843 A1* 2/2007 Trivedi et al. .................. 712/34
2010/0004841 A1 1/2010 Mueller et al.
2010/0088441 A1* 4/2010 Peterson et al. ............. 710/110
2010/0138693 A1 6/2010 Ohkawa
2013/0204493 A1* 8/2013 Ricci et al. ...................... 701/41
2014/0309886 A1* 10/2014 Ricci ............................... 701/41

FOREIGN PATENT DOCUMENTS

| JP | 6-139200 | 5/1994 |
| JP | 8-166931 | 6/1996 |
| JP | 2008-269487 | 11/2008 |
| JP | 2009-541636 | 11/2009 |
| JP | 2010-126012 | 6/2010 |
| JP | 2010-196619 | 9/2010 |

* cited by examiner

F I G . 1
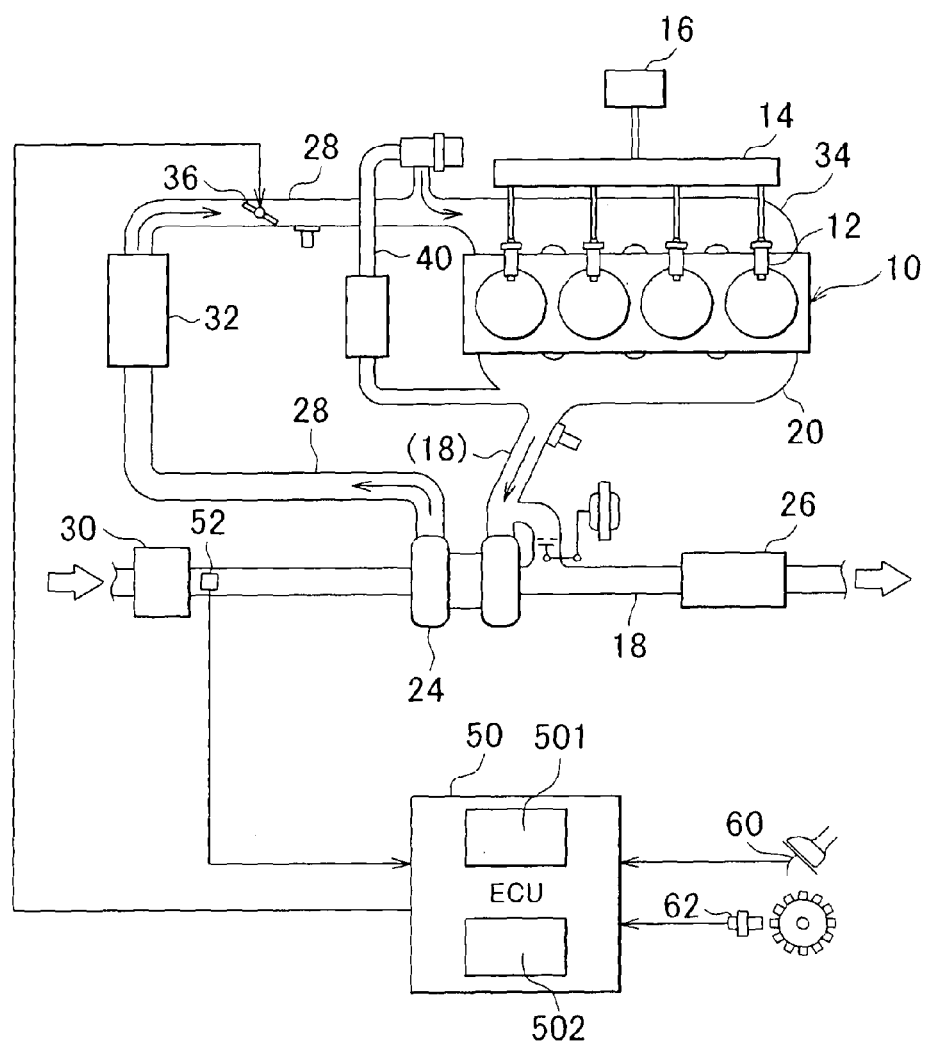

CONTROL DEVICE FOR INTERNAL COMBUSTION ENGINE

BACKGROUND OF THE INVENTION

1. Field of the Invention

The invention relates to a control device for an internal combustion engine and, more particularly, to a control device for an internal combustion engine, which uses a processor having a plurality of cores to perform operations.

2. Description of Related Art

As described in, for example, Published Japanese Translation of PCT application No. 2009-541636 (JP 2009-541636 A), there is known an engine control unit that has a plurality of execution units (cores) and that controls an internal combustion engine. The engine control unit distributes tasks to the plurality of execution units to execute parallel arithmetic processing. Specifically, in a mode for improving responsiveness, different programmes (programs) or tasks are subjected to parallel arithmetic processing. In addition, in a mode for increasing the safety of signal processing, parallel arithmetic processing in which the plurality of execution units execute the same program is performed.

Incidentally, in recent years, in an internal combustion engine that uses a control model, an increase in computational load at a high rotational speed range is problematic. Therefore, in a control range in which a computational load is high, tasks may be distributed to a plurality of cores to perform parallel arithmetic processing to thereby reduce the computational load. However, on the other hand, in a control range in which a computational load is low, in terms of suppressing heat generation and avoiding complex arithmetic processing due to task distribution, arithmetic processing may be performed by minimizing the number of cores used. However, in the above described existing system, task distribution is not performed on the basis of the controlled state of the internal combustion engine in parallel arithmetic processing. Therefore, a computational failure due to omission of a task in a high rotational speed range, heat generation in a low rotational speed range, or the like, may occur, so there is still room for improvement.

SUMMARY OF THE INVENTION

The invention provides a control device that is able to optimize arithmetic processing on the basis of the controlled state of an internal combustion engine that may be subjected to parallel arithmetic processing that uses a plurality of cores.

An aspect of the invention relates to a control device for an internal combustion engine, which includes control means that has a processor with a plurality of cores and that computes various tasks associated with operation of the internal combustion engine. The control means includes selecting means that selects at least one core used in the computation from among the plurality of cores, computing means that distributes the tasks to the at least one core selected by the selecting means, to perform computation, and acquisition means that acquires an engine rotational speed of the internal combustion engine. When the engine rotational speed acquired by the acquisition means is higher than or equal to a predetermined threshold, the selecting means increases the number of the cores, selected as compared with when the acquired engine rotational speed is lower than the predetermined threshold.

According to the above aspect, when the engine rotational speed of the internal combustion engine is higher than the predetermined threshold, the number of the cores used is increased as compared with when the engine rotational speed is lower than the predetermined threshold. Therefore, according to the aspect of the invention, in a control range in which a computational load is low, the number of cores used is limited to suppress heat generation and avoid complex arithmetic processing due to task distribution; whereas, in a control range in which a computational load is high, tasks are distributed to a larger number of multiple cores to perform parallel arithmetic processing to thereby make it possible to effectively suppress a computational failure, such as omission of a task due to an increase in computational load.

In the above aspect, the acquisition means may acquire a current engine rotational speed of the internal combustion engine.

According to the above aspect, the current engine rotational speed is acquired, and, when the acquired engine rotational speed is higher than or equal to the predetermined threshold, the number of the cores used is increased. Therefore, according to the aspect of the invention, it is possible to vary the number of cores used by accurately determining a variation in computational load.

In the above aspect, the acquisition means may include estimating means that estimates an engine rotational speed of the internal combustion engine after a predetermined period of time. When the estimated engine rotational speed is higher than or equal to the predetermined threshold, the computing means may increase the number of the cores selected as compared with when the estimated engine rotational speed is lower than the predetermined threshold.

According to the above aspect, an engine rotational speed after a predetermined period of time is estimated, and, when the estimated engine rotational speed is higher than or equal to the predetermined threshold, the number of cores used is increased. Therefore, according to the above aspect, the number of cores used may be increased by predicting an increase in computational load, so it is possible to effectively take measures against a steep variation in computational load.

In the above aspect, the estimating means may use a parameter of an engine operating state, that is, a current engine rotational speed and an injection amount, and subtract a total friction torque of the internal combustion engine and an auxiliary torque of a device other than the internal combustion engine from a required torque to estimate the engine rotational speed.

In the above aspect, when the engine rotational speed acquired by the acquisition means is higher than or equal to the predetermined threshold, the selecting means may increase the number of the cores selected.

In the above aspect, when the engine rotational speed acquired by the acquisition means is lower than the predetermined threshold, the selecting means may reduce the number of the cores selected.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a view for illustrating the schematic configuration of an internal combustion engine system according to a first embodiment of the invention;

DETAILED DESCRIPTION OF EMBODIMENTS

Figure 2:
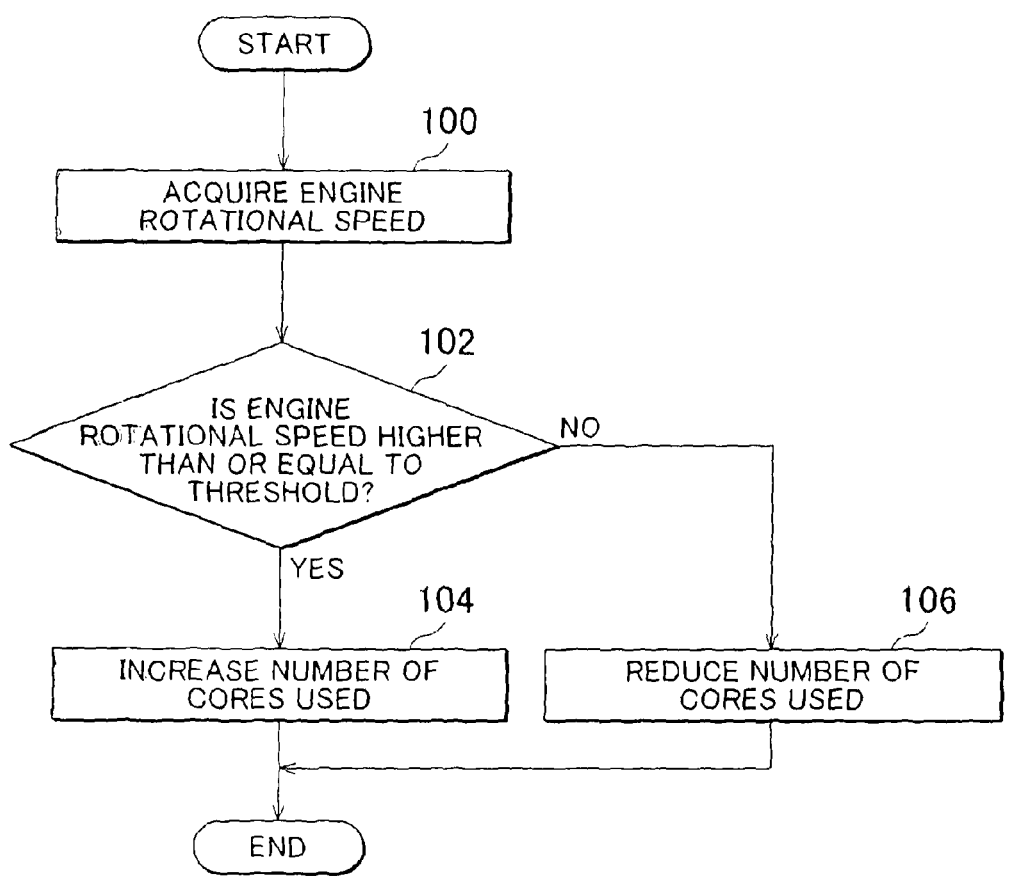
FIG. 2 is a flow chart of a routine executed in the first embodiment of the invention.

Hereinafter, embodiments of the invention will be described with reference to the accompanying drawings. Note that like reference numerals denote the same elements in the drawings and the overlap description is omitted. In addition, the following embodiments do not limit the aspect of the invention.

Configuration of First Embodiment

FIG. 1 is a view for illustrating the schematic configuration of an internal combustion engine system according to a first embodiment of the invention. As shown in FIG. 1, the system according to the present embodiment includes a four-cycle internal combustion engine 10 having a plurality of cylinders (four cylinders in FIG. 1). The internal combustion engine 10 is mounted on a vehicle, and is used as a power source for the vehicle.

Hereinafter, in the present embodiment, the case where the aspect of the invention is applied to control over a diesel engine (compression ignition internal combustion engine) will be described. However, the aspect of the invention is not limited to the diesel engine. The aspect of the invention may be applied to control over a petrol (gasoline) engine (spark ignition internal combustion engine) and other various internal combustion engines.

An injector 12 is provided at each of the cylinders of the internal combustion engine 10. Each injector 12 is used to directly inject fuel into the corresponding cylinder. The injectors 12 of the respective cylinders are connected to a common rail 14. Fuel in a fuel tank (not shown) is pressurized by a supply pump 16 to a predetermined fuel pressure, stored in the common rail 14, and then supplied from the common rail 14 to the injectors 12.

An exhaust passage 18 of the internal combustion engine 10 branches off by an exhaust manifold 20 and is connected to the exhaust ports (not shown) of the respective cylinders. The exhaust passage 18 is connected to the exhaust turbine of a turbocharger 24. An aftertreatment device 26 is provided on the downstream side of the turbocharger 24 in the exhaust passage 18. The aftertreatment device 26 is used to purify exhaust gas.

An air cleaner 30 is provided near the inlet of an intake passage 28 of the internal combustion engine 10. Air introduced through the air cleaner 30 is compressed by the intake air compressor of the turbocharger 24 and is then cooled by an intercooler 32. Intake air passing through the intercooler 32 is distributed to the intake ports (not shown) of the respective cylinders by an intake manifold 34.

An intake air throttle valve 36 is provided in the intake passage 28 between the intercooler 32 and the intake manifold 34. In addition, an air flow meter 52 is provided near the downstream of the air cleaner 30 in the intake passage 28. The air flow meter 52 is used to detect the intake air flow rate.

As shown in FIG. 1, the system according to the present embodiment includes an electronic control unit (ECU) 50. The ECU 50 is formed as a dual core ECU that has a processor on which two cores 501 and 502 are implemented, and is able to change the number of cores used each time. Various sensors for controlling the internal combustion engine 10 are connected to the input portion of the ECU 50. Various sensors include the above described air flow meter 52, an accelerator position sensor 60, a crank angle sensor 62, and the like. The accelerator position sensor 60 is used to detect the operation amount of an accelerator pedal. The, crank angle sensor 62 is used to detect the crank angle of the internal combustion engine 10. In addition, the above described injectors 12, the intake air throttle valve 36 and other various actuators for controlling the internal combustion engine 10 are connected to the output portion of the ECU 50. The ECU 50 executes a predetermined control algorithm for driving the various actuators on the basis of various pieces of information input to the ECU 50.

Operation of First Embodiment

Next, the operation of the first embodiment will be described. The internal combustion engine 10 in the first embodiment includes the injectors 12, the intake air throttle valve 36 and other various actuators for controlling the internal combustion engine 10, such as an EGR valve and a WGV, as actuators for controlling the operation of the internal combustion engine 10. The control device according to the present embodiment controls the internal combustion engine through so-called model based control. The control device makes heavy use of model prediction to estimate the controlled state, and determines the controlled amounts of the above described various actuators.

In such model based control, particularly, an increase in computational load in a high rotational speed range is problematic. Then, in the system according to the present embodiment, the ECU 50 equipped with two cores 501 and 502 is used to perform parallel arithmetic processing as measures against the computational load. Specifically, a known parallel compiler, such as an optimally scheduled advanced multiprocessor (OSCAR), is used to core-split an engine control algorithm, and then tasks distributed to the cores 501 and 502 are subjected to parallel arithmetic processing. In this way, when parallel arithmetic processing is allowed, a computational load is effectively reduced as compared with the case where sequential processing is performed with the use of a single core.

Here, in a control range in which a computational load is low, in terms of suppressing heat generated and avoiding complex arithmetic processing due to task distribution, arithmetic processing may be performed by minimizing the number of cores used. Then, in the system according to the first embodiment, the number of cores used is varied on the basis of a computational load. Specifically, the engine rotational speed is monitored as an index of a computational load, and, when the engine rotational speed is higher than or equal to a predetermined threshold, the number of cores used is increased. By so doing, in a range in which a computational load is high, the computational load may be reduced through parallel arithmetic processing that uses a plurality of cores; whereas, in a range in which a computational load is low, heat generation and complex computation may be suppressed through sequential arithmetic processing that uses a single core.

Specific Process in First Embodiment

Next, the specific process executed in the present embodiment will be described with reference to FIG. 2. FIG. 2 is a flow chart of a routine in which the ECU 50 varies the number of cores used in computation. Note that the routine shown in FIG. 2 is repeatedly executed during operation of the internal combustion engine 10.

In the routine shown in FIG. 2, initially, the engine rotational speed is acquired on the basis of a signal detected by the crank angle sensor 62 (step 100). Subsequently, it is determined whether the engine rotational speed acquired in step 100 is higher than or equal to a predetermined threshold (step 102). The predetermined threshold is a preset rotational speed at or above which a computational failure, such as omission of a task, may occur in sequential computation that uses a single core. As a result, when it is determined that the current engine rotational speed is higher than or equal to the predetermined threshold, it is determined that a computational failure is likely to occur. The process proceeds to the next step, and then the number of cores used is increased (step 104). Here, specifically, the number of cores used is set at two.

On the other hand, when it is determined in step 102 that the current engine rotational speed is lower than the predetermined threshold, it is determined that a computational failure is not likely to occur. The process proceeds to the next step, and then the number of cores used is reduced to a single core (step 106).

As described above, with the system according to the present embodiment, the number of cores of the ECU 50, used in computation, is varied on the basis of the detected current engine rotational speed. By so doing, it is possible to optimize arithmetic processing on the basis of a computational load on the ECU 50.

Incidentally, in the above described first embodiment, the ECU 50 equipped with two cores is used to change the number of cores used between two and one; however, the usable ECU 50 is not limited to this configuration. That is, as long as an ECU has a plurality of cores and is able to vary the number of cores used, the ECU may be configured as a multi-core ECU equipped with a further large number of cores. In addition, changing the number of cores used on the basis of the engine rotational speed is also not limited to the configuration of the present embodiment. For example, it is applicable that, in an ECU equipped with three or more cores, a plurality of thresholds are set such that the number of cores used gradually increases as the engine rotational speed increases.

Note that, in the above described first embodiment, the ECU 50 may correspond to a "control unit" or "control means" according to the aspect of the invention, the ECU 50 that executes the process of step 100 may correspond to an "acquisition unit" or "acquisition means" according to the aspect of the invention, and the ECU 50 that executes the processes of steps 102 to 106 may correspond to a "selecting unit" or "selecting means" according to the aspect of the invention.

Feature of Second Embodiment

Next, a second embodiment of the invention will be described with reference to FIG. 3. In the second embodiment, the system shown in FIG. 1 is used to execute the routine shown in FIG. 3 (described later).

In the system according to the above described first embodiment, the number of cores used of the ECU 50 is varied on the basis of the current engine rotational speed. However, in consideration of a steep variation in engine rotational speed, and the like, an increase in the number of cores used may not be in time for an increase in computational load.

Then, in the system according to the second embodiment, for example, an engine rotational speed after a lapse of 32 ins that corresponds to a delay from fuel injection is estimated and, when the estimated engine rotational speed is higher than or equal to the predetermined threshold, the number of cores used is increased. By so doing, the number of cores used may be increased by predicting an increase in computational load in advance, so it is possible to effectively suppress omission of a task due to a transient steep increase in computational load.

Specific Process in Second Embodiment

Next, the specific process executed in the present embodiment will be described with reference to FIG. 3. FIG. 3 is a flow chart of a routine in which the ECU 50 varies the number of cores used in computation. Note that the routine shown in FIG. 3 is repeatedly executed during operation of the internal combustion engine 10.

Figure 3:
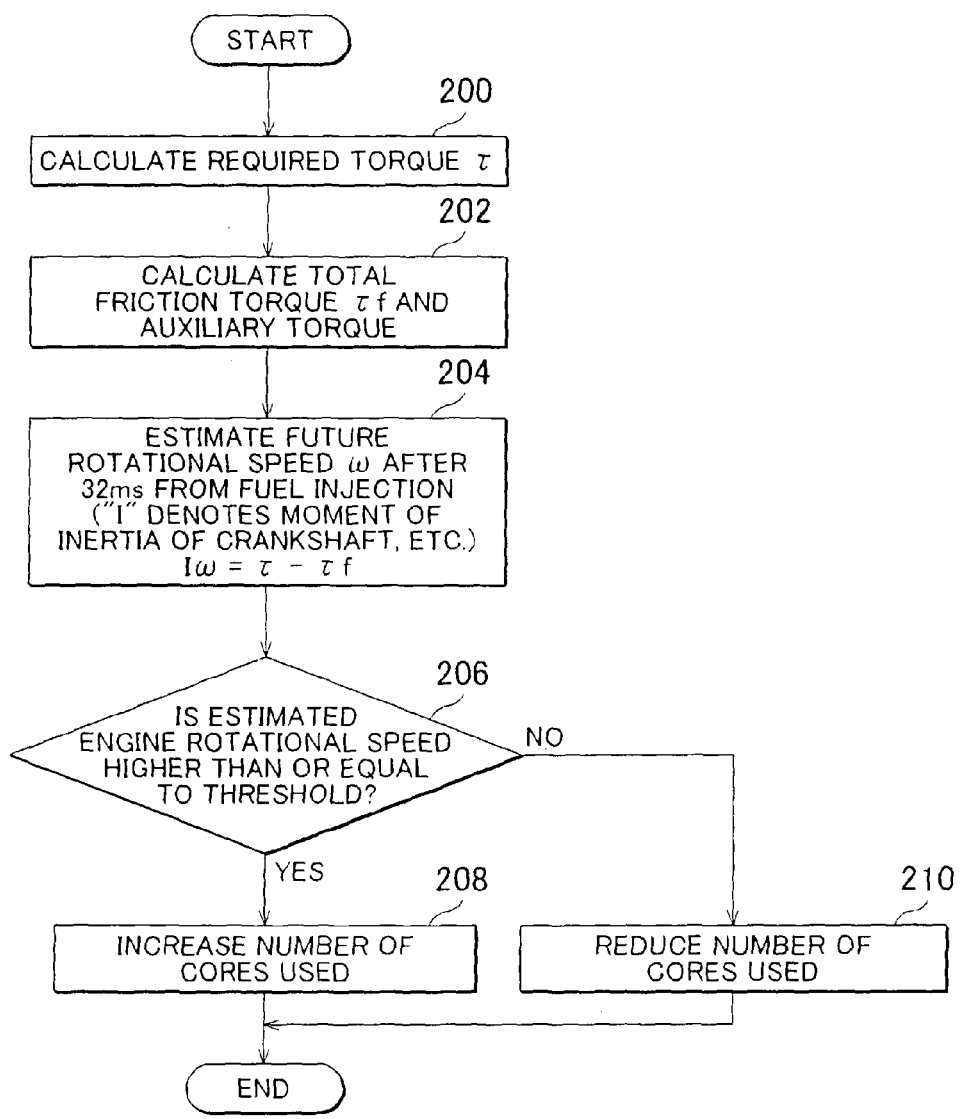
FIG. 3 is a flow chart of a routine executed in a second embodiment of the invention.

In the routine shown in FIG. 3, initially, a required torque $\tau$ is calculated using an engine operating state, such as a current engine rotational speed and a current injection amount (step 200). Subsequently, a total friction torque $\tau f$ and an auxiliary torque is calculated (step 202). The friction torque is a torque due to mechanical friction between fitting portions, such as friction between a piston and a cylinder inner wall. The auxiliary torque is a torque due to mechanical friction of auxiliaries. The total friction torque $\tau f$ may be, for example, identified using a map that defines the relationship between an engine operating state and the total friction torque $\tau f$.

Subsequently, a rotational speed $\omega$ after a lapse of 32 ms from fuel injection is predicted (step 204). Here, specifically, the required torque $\tau$ calculated in in step 200 and the total friction torque $\tau f$ and the auxiliary torque, calculated in step 202, are substituted into the following equation (1) in accordance with equation of motion to thereby calculate an angular acceleration $d\omega/dt$ of the crankshaft.

$$I \cdot d\omega/dt = \tau - \tau f \quad (1)$$

Note that "I" denotes the moment of inertia (inertia) of members (crankshaft, and the like) driven through combustion of air-fuel mixture, and is a constant determined on the basis of the hardware configuration of the internal combustion engine 10. After that, the calculated angular acceleration &At is integrated to calculate the rotational speed $\omega$ of the crankshaft.

Subsequently, it is determined whether an engine rotational speed after a lapse of 32 ms (32 ms-later engine rotational speed), obtained from the rotational speed $\omega$ calculated in step 204, is higher than or equal to the predetermined threshold (step 206). As a result, when it is determined that the 32 ms-later engine rotational speed is higher than or equal to the predetermined threshold, it is determined that a computational failure is likely to occur: The process proceeds to the next step, and then the number of cores used is increased (step 208). Here, specifically, the number of cores used is set at two.

On the other hand, when it is determined in step 206 that the 32 ms-later engine rotational speed is lower than the predetermined threshold, it is determined that a computational failure is not likely to occur. The process proceeds to the next step, and then the number of cores used is reduced to a single core (step 210).

As described, above, with the system according to the present embodiment, the number of cores of the ECU 50, used in computation, is determined on the basis of the estimated 32 ms-later engine rotational speed. By so doing, a variation in computational load of the ECU 50 is predicted in advance, and then the number of cores used may be varied to an optimal number.

Incidentally, in the above described second embodiment, the ECU 50 equipped with two cores is used to change the number of cores used between two and one; however, the usable ECU 50 is not limited to this configuration. That is, as long as an ECU has a plurality of cores and is able to vary the number of cores used, the ECU may be configured as a multi-core ECU equipped with a further large number of cores. In addition, changing the number of cores used on the basis of the engine rotational speed is also not limited to the configuration of the present embodiment. For example, it is applicable that, in an ECU equipped with three or more cores, a plurality of thresholds are set such that the number of cores used gradually increases as the engine rotational speed increases.

In addition, in the above described second embodiment, the 32 ms-later engine rotational speed is estimated as an engine rotational speed after a delay from injection amount. However, as long as a period of time during which the number of cores may be varied in advance in response to a variation in computational load, a period of time prior to which estimation is performed is not limited to 32 ms.

Note that, in the above described second embodiment, the ECU 50 may correspond to a "control unit" or "control means" according to the aspect of the invention, the ECU 50 that executes the processes of step 200 to step 204 may correspond to an "acquisition unit" or "acquisition means" according to the aspect of the invention, and the ECU 50 that executes the processes of step 206 to step 210 may correspond to a "selecting unit" or "selecting means" according to the aspect of the invention.

The invention claimed is:

1. A control device for an internal combustion engine, comprising:
    an electronic control unit including a processor with a plurality of cores,
    the electronic control unit configured to compute various tasks associated with operation of the internal combustion engine,
    the electronic control unit configured to select at least one core used in the computation from among the plurality of cores,
    the electronic control unit configured to distribute the tasks to the at least one selected core to perform computation,
    the electronic control unit configured to acquire an engine rotational speed of the internal combustion engine, and
    when the acquired engine rotational speed is higher than a predetermined threshold, the electronic control unit is configured to increase the number of the cores selected as compared with when the acquired engine rotational speed is lower than the predetermined threshold.

2. The control device according to claim 1, wherein the electronic control unit is configured to acquire a current engine rotational speed of the internal combustion engine.

3. The control device according to claim 1, wherein:
    the electronic control unit is configured to estimate an engine rotational speed of the internal combustion engine after a predetermined period of time; and
    when the estimated engine rotational speed is higher than the predetermined threshold, the electronic control unit is configured to increase the number of the cores selected as compared with when the estimated engine rotational speed is lower than the predetermined threshold.

4. The control device according to claim 3, wherein the electronic control unit is configured to estimate the engine rotational speed, using a parameter of an engine operating state, by subtracting a total friction torque of the internal combustion engine and an auxiliary torque of a device other than the internal combustion engine from a required torque, the engine operating state is a current engine rotational speed and an injection amount.

5. The control device according to claim 1, wherein when the engine rotational speed is higher than or equal to the predetermined threshold, the electronic control unit is configured to increase the number of the cores selected.

6. The control device according to claim 1, wherein when the engine rotational speed is lower than the predetermined threshold, the electronic control unit is configured to reduce the number of the cores selected.

* * * * *